(12) United States Patent
Ohtomo et al.

(10) Patent No.: US 7,633,609 B2
(45) Date of Patent: Dec. 15, 2009

(54) MEASURING SYSTEM

(75) Inventors: Fumio Ohtomo, Itabashi-ku (JP);
Kaoru Kumagai, Itabashi-ku (JP);
Fumihiko Kamizono, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 12/152,931

(22) Filed: May 19, 2008

(65) Prior Publication Data
US 2008/0304041 A1 Dec. 11, 2008

(30) Foreign Application Priority Data
Jun. 8, 2007 (JP) ............................. 2007-152842

(51) Int. Cl.
*G01B 11/26* (2006.01)
(52) U.S. Cl. ................................... 356/141.1
(58) Field of Classification Search ........ 356/3.01–28.5
See application file for complete search history.

(56) References Cited

U.S. PATENT DOCUMENTS 6,693,706 B2 * 2/2004 Kahle et al. .............. 356/141.3
7,110,102 B2 9/2006 Ohtomo et al. ........... 356/141.4

FOREIGN PATENT DOCUMENTS

| | | |
|---|---|---|
| JP | 10-246634 | 9/1998 |
| JP | 2004-212058 | 7/2004 |
| JP | 2006-337302 | 12/2006 |
| JP | 2008-082895 | 4/2008 |

* cited by examiner

*Primary Examiner*—Thomas H Tarcza
*Assistant Examiner*—Luke D Ratcliffe
(74) *Attorney, Agent, or Firm*—Nields, Lemack & Frame, LLC

(57) ABSTRACT

A measuring system, comprising a surveying instrument for projecting a laser beam by rotary irradiation and a photodetection sensor device installed at a measuring point, wherein the surveying instrument comprises a first radio communication unit, the photodetection sensor device comprises a second radio communication unit, and communication can be performed between the surveying instrument and the photodetection sensor device, wherein the surveying instrument comprises an angle detecting means for detecting a horizontal angle in a projecting direction of the laser beam and a first arithmetic unit for controlling the angle detecting means based on a receiving signal from the first radio communication unit, and the photodetection sensor device comprises a photodetection unit for receiving the laser beam and a second arithmetic unit for performing transmission of a photodetection notifying signal to notify the receiving of the laser beam by the photodetection unit and also for performing transmission of a synchronization data by the second radio communication unit to the first radio communication unit, wherein the first arithmetic unit calculates a horizontal angle of the projection of the laser beam when the photodetection sensor device receives the laser beam based on the photodetection notifying signal and the synchronization data.

9 Claims, 6 Drawing Sheets

MEASURING SYSTEM

BACKGROUND OF THE INVENTION

The present invention relates to a measuring system for performing measurement on an object to be measured by projecting a laser beam by rotary irradiation.

As one of the surveying devices, a type of surveying device is known, by which a pulsed light (distance measuring light) for measuring distance is projected by rotary irradiation, and a distance to an object to be measured is determined by receiving and detecting a light reflected from the object to be measured. This type of surveying device is advantageous in that distances to a plurality of objects to be measured can be determined at the same time. Also, in the measuring operation, in addition to the measurement of distance, it is necessary to measure a position of the object to be measured in a horizontal direction, i.e. to measure a horizontal angle.

In a surveying device of rotary irradiation type, which has been proposed in recent years, in addition to the distance measuring light, a laser beam (a scanning light) is projected by rotary irradiation for detecting an object to be measured or to form a reference plane. The scanning light is a continuous light. The surveying device comprises a protractor (e.g. an encoder), which can continuously detect a horizontal angle in the direction where the scanning light is projected. When the scanning light is projected by rotary irradiation in the total circumference and passes through the object to be measured, a reflection light (reflected scanning light) reflected from the object to be measured is received and detected. By reading an angle of the protractor at the time of detection, a horizontal angle of the object to be measured is determined.

When the horizontal angle of the object to be measured is detected, the distance measuring light is projected within a range as required around the detected horizontal angle, and a distance is measured.

This type of surveying device is based on the detection by an optical system, which detects a reflection light from the object to be measured. In this respect, the surveying device must have structure including the need to have a photodetection optical system for the surveying device and must have complicated design. Also, the reflection light must have a light amount enough for the detection. On the other hand, the scanning light, which is a continuous light, has a limitation in the intensity of irradiation from safety reason. Accordingly, there is limitation in the distance for the purpose of confirming of the object to be measured and for the measurement of angle.

SUMMARY OF THE INVENTION

It is an object of the present invention to provide a measuring system, by which it is possible to confirm an object to be measured and to perform the measurement of a horizontal angle by using convenient communication means, and it is also possible to reduce the cost.

To attain the above object, the measuring system according to the present invention comprises a surveying instrument for projecting a laser beam by rotary irradiation and a photodetection sensor device installed at a measuring point, wherein the surveying instrument comprises a first radio communication unit, the photodetection sensor device comprises a second radio communication unit, and communication can be performed between the surveying instrument and the photodetection sensor device, wherein the surveying instrument comprises an angle detecting means for detecting a horizontal angle in a projecting direction of the laser beam and a first arithmetic unit for controlling the angle detecting means based on a receiving signal from the first radio communication unit, and the photodetection sensor device comprises a photodetection unit for receiving the laser beam and a second arithmetic unit for performing transmission of a photodetection notifying signal to notify the receiving of the laser beam by the photodetection unit and also for performing transmission of a synchronization data by the second radio communication unit to the first radio communication unit, wherein the first arithmetic unit calculates a horizontal angle of the projection of the laser beam when the photodetection sensor device receives the laser beam based on the photodetection notifying signal and the synchronization data.

Also, the invention provides a measuring system which comprises a surveying instrument for projecting a laser beam by rotary irradiation and a photodetection sensor device installed at a measuring point, wherein the surveying instrument comprises a first radio communication unit, the photodetection sensor device comprises a second radio communication unit, and communication can be performed between the surveying instrument and the photodetection sensor device, wherein the photodetection sensor device comprises a photodetection unit for detecting the laser beam, a second signal processing unit for preparing a photodetection notifying signal based on the detection of the laser beam by the photodetection unit, for synthesizing synchronization data with the photodetection notifying signal, and for detecting the synchronization data, and the second radio communication unit for transmitting the photodetection notifying signal to the surveying instrument, and wherein the surveying instrument comprises the first radio communication unit for receiving the photodetection notifying signal and a first signal processing unit for detecting synchronization data from the photodetection notifying signal, wherein the photodetection sensor device detects the synchronization data and the synchronization data is detected by the surveying instrument, and signal processing is synchronized between the photodetection sensor device and the surveying instrument.

Further, the invention provides a measuring system as described above, wherein the signal processing is signal processing for detecting a horizontal angle, wherein the photodetection sensor device comprises a second time measuring means, the second time measuring means measures a time $\Delta T$ from the moment of the detection of the laser beam by the photodetection unit to the moment of the transmission of synchronization data of the transmitted photodetection notifying signal, and the time $\Delta T$ is transmitted to the surveying instrument via the second radio communication unit, and wherein the surveying instrument comprises a first time measuring means, an angle detecting means for detecting a horizontal angle associated with the time, and an arithmetic unit for calculating the horizontal angle, wherein the first time measuring means detects the time of detection of the synchronization data, the arithmetic unit inversely calculates the time $\Delta T$ from the detected time, calculates the time when the photodetection unit detects the laser beam, and calculates the horizontal angle by the angle detecting means at the time.

Also, the invention provides a measuring system as described above, wherein the surveying instrument has a distance measuring unit, a distance to the photodetection sensor device is measured by the distance measuring unit, and an error in the horizontal angle caused by time delay in propagation time of the laser beam or in propagation time of the photodetection notifying signal is compensated according to the measured distance. Further, the invention provides a measuring system as described above, wherein the surveying instrument has a distance measuring unit, a distance to the photodetection sensor device is measured by the distance measuring unit, and when the measured distance is more than a predetermined value, an error in the horizontal angle due to delay in propagation time of the laser beam or in propagation time of the photodetection notifying signal is compensated. Also, the invention provides a measuring system as described above, wherein the photodetection sensor device transmits an ID data to the surveying instrument, and the surveying instrument associates the ID data with the horizontal angle so that the photodetection sensor device can be identified. Further, the invention provides a measuring system as described above, wherein the laser beam is a fan-shaped laser beam. Also, the invention provides a measuring system as described above, wherein test data is further included in the photodetection notifying signal. Further, the invention provides a measuring system as described above, wherein the ID data is added to the photodetection notifying signal.

According to the present invention, a measuring system comprises a surveying instrument for projecting a laser beam by rotary irradiation and a photodetection sensor device installed at a measuring point, wherein the surveying instrument comprises a first radio communication unit, the photodetection sensor device comprises a second radio communication unit, and communication can be performed between the surveying instrument and the photodetection sensor device, wherein the surveying instrument comprises an angle detecting means for detecting a horizontal angle in a projecting direction of the laser beam and a first arithmetic unit for controlling the angle detecting means based on a receiving signal from the first radio communication unit, and the photodetection sensor device comprises a photodetection unit for receiving the laser beam, and a second arithmetic unit for performing transmission of a photodetection notifying signal to notify the receiving of the laser beam by the photodetection unit and also for performing transmission of a synchronization data by the second radio communication unit to the first radio communication unit, wherein the first arithmetic unit calculates a horizontal angle of the projection of the laser beam when the photodetection sensor device receives the laser beam based on the photodetection notifying signal and the synchronization data. As a result, there is no need to have synchronization at all times between the surveying instrument and the photodetection sensor device. This makes it possible to design the system in simple structure and arrangement. Also, there is no need to maintain the stability with high accuracy in clock signals of both of the surveying instrument and the photodetection sensor device. Further, there is no need to have continuous communication between the two devices for synchronization. Also, high stability is not required for the communication device. This means that a clock signal generator with high accuracy is not needed and high stability is also not required so much. The circuit configuration is simple, and a horizontal angle can be measured each time from the reset condition, and it is possible to measure a horizontal angle with fewer error and with high reliability.

According to the present invention, a measuring system comprises a surveying instrument for projecting a laser beam by rotary irradiation and a photodetection sensor device installed at a measuring point, the surveying instrument comprises a first radio communication unit, the photodetection sensor device comprises a second radio communication unit, and communication can be performed between the surveying instrument and the photodetection sensor device, wherein the photodetection sensor device comprises a photodetection unit for detecting the laser beam, a second signal processing unit for preparing a photodetection notifying signal based on the detection of the laser beam by the photodetection unit, for synthesizing synchronization data with the photodetection notifying signal, and for detecting the synchronization data, and the second radio communication unit for transmitting the photodetection notifying signal to the surveying instrument, and wherein the surveying instrument comprises the first radio communication unit for receiving the photodetection notifying signal and a first signal processing unit for detecting synchronization data from the photodetection notifying signal, wherein the photodetection sensor device detects the synchronization data and the synchronization data is detected by the surveying instrument, and signal processing is synchronized between the photodetection sensor device and the surveying instrument. As a result, there is no need to have synchronization at all times between the surveying instrument and the photodetection sensor device. This makes it possible to design the system in simple structure and arrangement. Also, there is no need to maintain the stability with high accuracy in clock signals of both of the surveying instrument and the photodetection sensor device. In other words, there is no need to have continuous communication between the two devices for synchronization. Also, high stability is not required for the communication device. This means that a clock signal generator with high accuracy is not needed and high stability is also not required so much. As a result, the circuit configuration is simple.

Further, according to the present invention, the signal processing is signal processing for detecting a horizontal angle, wherein the photodetection sensor device comprises a second time measuring means, the second time measuring means measures a time $\Delta T$ from the moment of the detection of the laser beam by the photodetection unit to the moment of the transmission of synchronization data of the transmitted photodetection notifying signal, and the time $\Delta T$ is transmitted to the surveying instrument via the second radio communication unit, and wherein the surveying instrument comprises a first time measuring means, an angle detecting means for detecting a horizontal angle associated with the time, and an arithmetic unit for calculating the horizontal angle, wherein the first time measuring means detects the time of detection of the synchronization data, the arithmetic unit inversely calculates the time $\Delta T$ from the detected time, calculates the time when the photodetection unit detects the laser beam, and calculates the horizontal angle by the angle detecting means at the time. Accordingly, a horizontal angle can be measured each time from the reset condition, and it is possible to measure a horizontal angle with fewer error and with high reliability.

Also, according to the present invention, the surveying instrument has a distance measuring unit, a distance to the photodetection sensor device is measured by the distance measuring unit, and an error in the horizontal angle caused by time delay in propagation time of the laser beam or in propagation time of the photodetection notifying signal is compensated according to the measured distance. Also, the surveying instrument has a distance measuring unit, a distance to the photodetection sensor device is measured by the distance measuring unit, and when the measured distance is more than a predetermined value, an error in the horizontal angle due to delay in propagation time of the laser beam or in propagation time of the photodetection notifying signal is compensated.

Thus, it is possible to measure the horizontal angle with high accuracy regardless of whether it is the measurement for short distance or for long distance.

Also, according to the present invention, the photodetection sensor device transmits an ID data to the surveying instrument, and the surveying instrument associates the ID data with the horizontal angle so that the photodetection sensor device can be identified. As a result, by using a plurality of photodetection sensor devices, measurement can be made at the same time.

Further, according to the present invention, the laser beam is a fan-shaped laser beam. This makes the detection of the photodetection sensor device much easier.

DETAILED DESCRIPTION OF THE PREFERRED EMBODIMENT

Detailed description will be given below on the best mode for carrying out the invention referring to the attached drawings.

First, referring to FIG. 1 and FIG. 2, description will be given on general features of a measuring system, in which the present invention is carried out.

Figure 1:
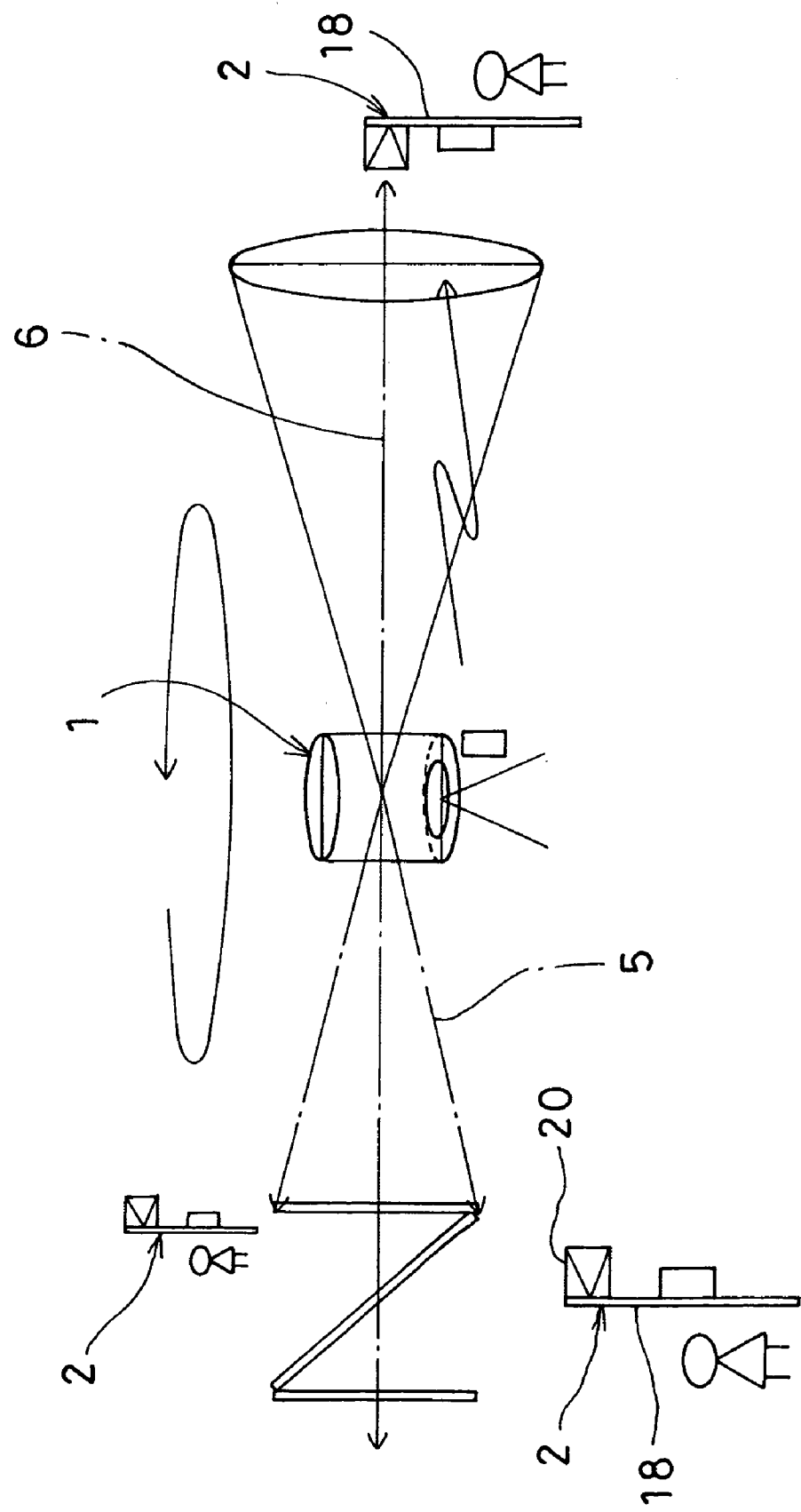
FIG. 1 is a schematical drawing to explain approximate arrangement of a measuring system according to the invention.

In FIG. 1, reference numeral 1 denotes a surveying instrument, and numeral 2 represents a photodetection sensor device, which is an object to be measured.

The surveying instrument 1 comprises a reference plane forming unit 3 and a distance measuring unit 4, and the surveying instrument 1 is installed at a known point. The reference plane forming unit 3 projects at a constant speed a scanning light 5 which is a continuous light by rotary irradiation via a rotating unit 10. The distance measuring unit 4 can project a distance measuring light 6, which is a pulsed light beam, via the rotating unit 10 by rotary irradiation. A single rotating unit 10 may be commonly used as the rotating unit of the reference plane forming unit 3 and the rotating unit of the distance measuring unit 4. Or, the rotating units 10 and 10 to be driven independently from each other may be provided, and the scanning light 5 and the distance measuring light 6 may be projected independently from each other.

The photodetection sensor device 2 receives and detects the scanning light 5, and the result of the photodetection is transmitted to the surveying instrument 1. Then, the surveying instrument 1 detects the photodetection sensor device 2, and by receiving and detecting the distance measuring light 6 reflected by the photodetection sensor device 2, distances to the photodetection sensor devices 2 at a plurality of points can be measured.

Figure 3:
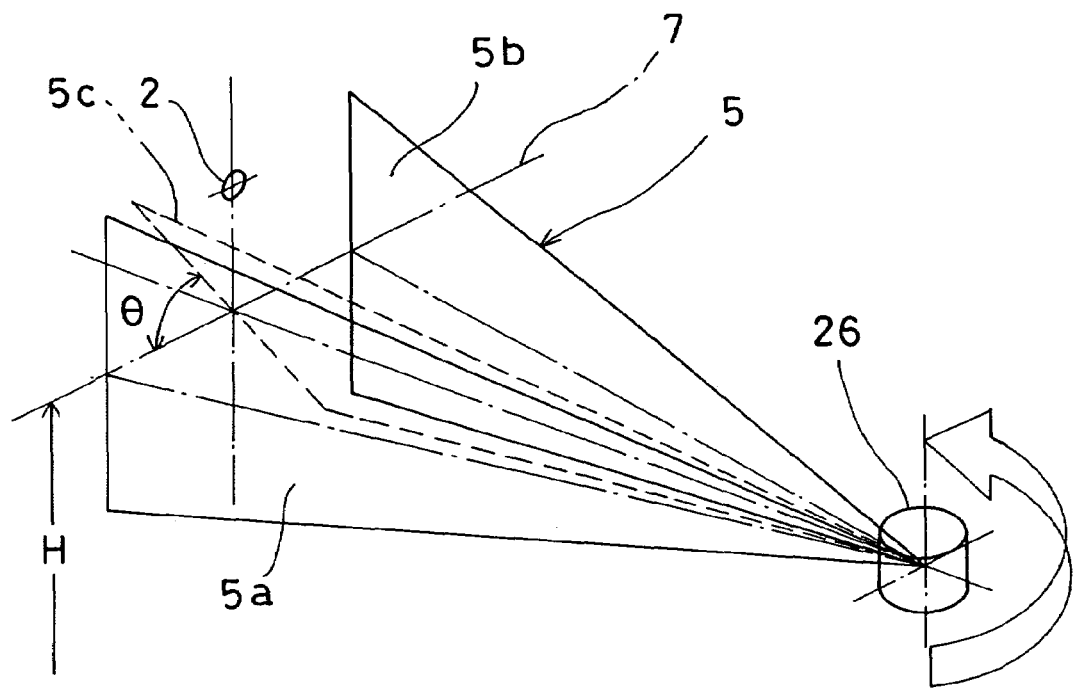
FIG. 3 is a schematical drawing to show a case where a scanning light is a plurality of fan-shaped laser beams arranged in N-shaped form.

The reference plane forming unit 3 projects the scanning light 5 at a constant speed by rotary irradiation and forms a horizontal reference plane 7 (see FIG. 3). The horizontal reference plane 7 is a horizontal plane to be formed by the center of the cross-section of the luminous flux of the scanning light 5. The scanning light 5 is composed of two or more fan-shaped laser beams spreading in a vertical direction, and at least one of the fan-shaped laser beams is tilted with respect to the horizontal plane at a known angle. Because the scanning light 5 has spreading in a vertical direction, the photodetection sensor device 2 can easily detect the scanning light 5 at positions in vertical (up-to-bottom) direction in wide range.

Figure 2:
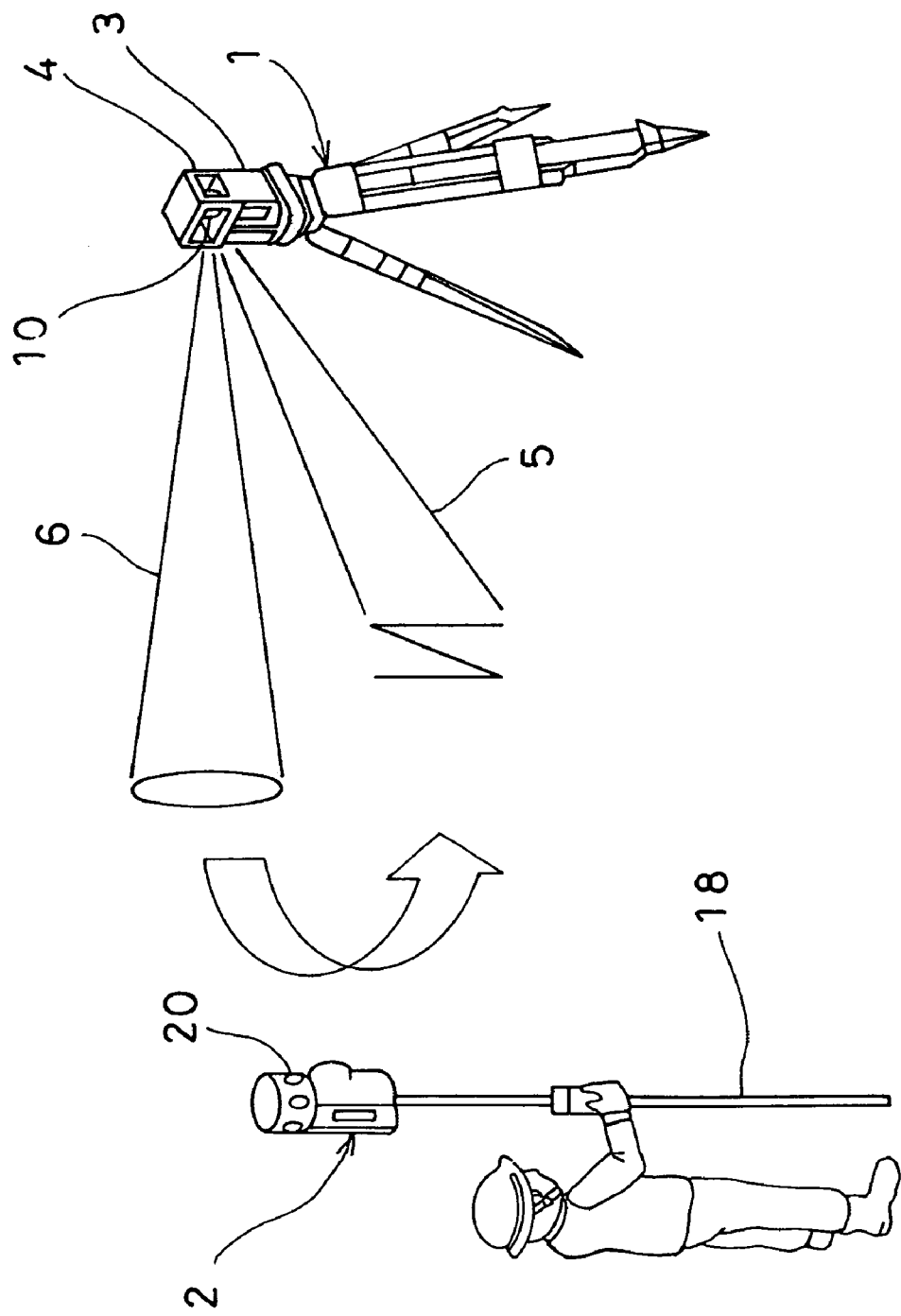
FIG. 2 is a perspective view to explain general features of the measuring system.

In the FIG. 2, the scanning light 5 is composed of three fan-shaped laser beams, and the cross-section of the luminous flux is in N-shaped form. As a laser device for projecting three or more fan-shaped laser beams by rotary irradiation with one of the laser beams tilted, a rotary laser device is proposed in JP-A-2004-212058.

Figure 4:
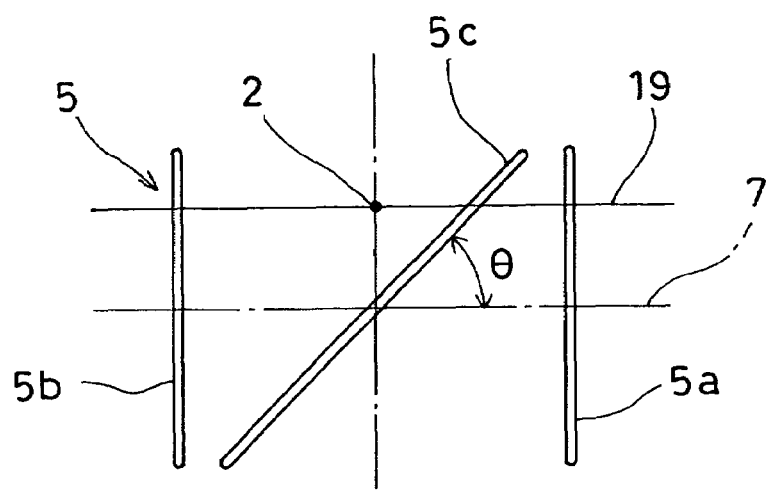
FIG. 4 is a drawing to explain the relation between the scanning light in N-shaped arrangement and a photodetection (light receiving) sensor device.

As shown in FIG. 3 and FIG. 4, when the scanning light 5 is projected by rotary irradiation, and two or more fan-shaped light beams $5a$, $5b$ and $5c$ pass through the photodetection sensor device 2, the photodetection sensor device 2 receives and detects two or more of the fan-shaped laser beams $5a$, $5b$ and $5c$, and this causes time lags when the light beams are received. By obtaining time difference between the moments of light receiving (photodetection), an elevation angle to the horizontal reference plane 7 can be obtained based on the time difference and based on a tilt angle θ of the tilted fan-shaped laser beam. Also, based on the elevation angle, a tilt reference plane can be set.

The scanning light 5 with the cross-section in N-shaped form is projected by rotary irradiation, and a distance measuring light 6 is projected by rotary irradiation. And a distance to the object to be measured is determined by receiving the light reflected from the object to be measured. This type of a surveying device is disclosed in JP-A-2006-337302. In this surveying device, the distance measuring light 6 is projected by rotary irradiation, and distances to a plurality of photodetection sensor devices 2 can be measured at the same time. Therefore, based on the measured elevation angle and the measured distance, the positions in the direction of height of the objects to be measured, i.e. the photodetection sensor devices 2, can be determined.

For detecting and specifying the photodetection sensor device 2, when the scanning light 5 is projected by rotary irradiation and the photodetection sensor devices 2 receive the scanning light 5, a photodetection notifying signal to notify the photodetection (receiving) of the light is transmitted from the photodetection sensor device 2 to the surveying instrument 1. By detecting an angle of the scanning light 5 in the projecting direction when the photodetection notifying signal is received, i.e. by detecting a horizontal angle, the photodetection sensor device 2 can be specified and identified, and the detected horizontal angle is determined as a position in a horizontal direction (i.e. horizontal angle) of the photodetection sensor device 2.

As a result, in the photodetection sensor device 2, an elevation angle is calculated. From the photodetection sensor device 2, the calculated elevation angle and the photodetection notifying signal are transmitted to the surveying instrument 1. At the surveying instrument 1, the distance is measured and three-dimensional position of the photodetection sensor device 2 is determined according to the received elevation angle and the detected horizontal angle.

The results of measurement obtained at the surveying instrument 1 is transmitted to the photodetection sensor device 2 as necessary, and the result of measurement is stored in the photodetection sensor device 2 as a position measurement data of the photodetection sensor device 2.

As described above, bi-directional communication is performed between the surveying instrument 1 and the photodetection sensor device 2. As respective communication means, the surveying instrument 1 has a radio communication unit 17 (to be described later), and the photodetection sensor device 2 has a photodetection side radio communication unit 21 (to be described later).

Figure 5:
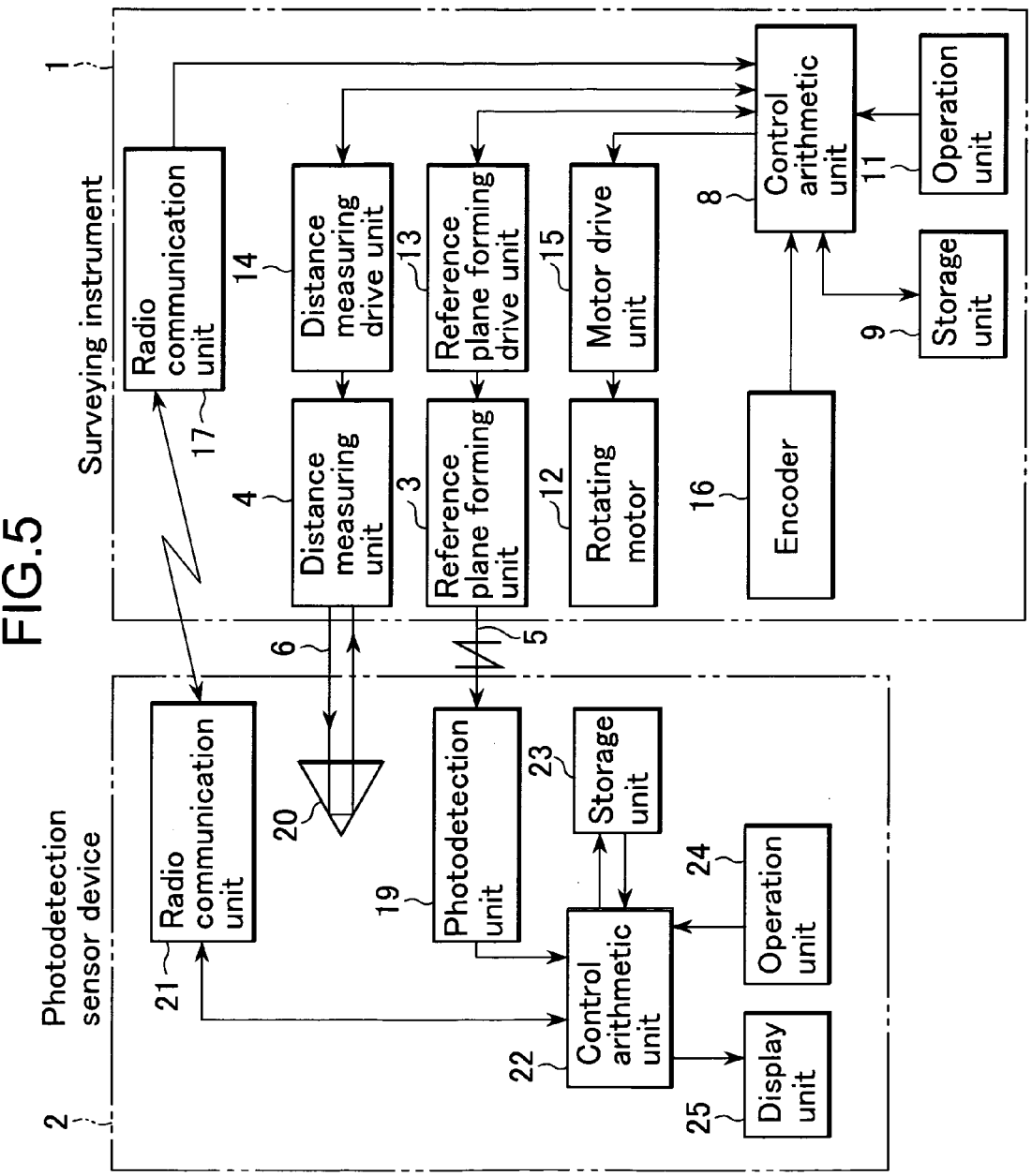
FIG. 5 is a schematical block diagram to show approximate arrangement of a surveying instrument and the photodetection sensor device.

Next, referring to FIG. 5, description will be given below on approximate arrangement of a measuring system, in which the present invention is carried out. In the following, description will be given on a case where the scanning light 5 and the distance measuring light 6 are projected by rotary irradiation via a common rotating unit 10.

The surveying instrument 1 primarily comprises the reference plane forming unit 3, the distance measuring unit 4, a control arithmetic unit 8, a storage unit 9, an operation unit 11, a rotating motor 12 for projecting the scanning light 5 and the distance measuring light 6 by rotary irradiation, a reference plane forming drive unit 13 for driving the reference plane forming unit 3, a distance measurement drive unit 14 for driving the distance measuring unit 4, a motor drive unit 15 for driving the rotating motor 12, the radio communication unit 17 for communicating with the photodetection sensor device 2, and a protractor (e.g. an encoder) 16 for detecting the projecting directions of the scanning light 5 and the distance measuring light 6. The driving of the reference plane forming drive unit 13, the distance measurement drive unit 14 and the motor drive unit 15 is controlled by the control arithmetic unit 8. A horizontal angle detected by the encoder 16 is associated with the time when the horizontal angle is acquired and is stored in the storage unit 9. The encoder 16 and a time measuring means (to be describe later) make up together a horizontal angle detecting means.

In the storage unit 9, various types of programs are stored, i.e. a sequence program for driving the reference plane forming drive unit 13, the distance measurement drive unit 14 and the motor drive unit 15 to carry out the distance measurement and angle measurement, a surveying program for executing distance measurement and horizontal angle measurement, and other programs are stored. Also, the measurement data are stored and are kept in memory.

The photodetection sensor device 2 is installed at a known height on a pole 18 (see FIG. 1), and the photodetection sensor device 2 primarily comprises a photodetection unit 19 for receiving the scanning light 5, and a reflector such as a prism 20 for reflecting the distance measuring light 6, the photodetection side radio communication unit 21 for performing radio communication with the radio communication unit 17 of the surveying instrument 1, a photodetection side control arithmetic unit 22, a photodetection side storage unit 23, a photodetection side operation unit 24, and a photodetection side display unit 25. The photodetection side display unit 25 may be designed as a touch panel so that the photodetection side display unit 25 can also fulfill the function of the photodetection side operation unit 24.

The photodetection side radio communication unit 21 can perform radio communication such as transmitting and receiving of data mutually to and from the photodetection side radio communication unit 21 of another photodetection sensor device 2.

Various types of programs are stored in the photodetection side storage unit 23, and these programs include: a calculation program for calculating an elevation angle based on photodetection time difference when a plurality of fan-shaped laser beams are received, a calculation program for calculating a position in height based on the elevation angle and the distance measurement data, a communication program for performing radio communication with the surveying instrument 1, the other photodetection sensor device 2, and the radio communication unit 17 via the photodetection side radio communication unit 21, and an image display program for displaying contents of instruction, contents of operation, contents of communication, etc. on the photodetection side display unit 25. Also, the measurement data transmitted from the surveying instrument 1 and the measurement data obtained at the photodetection sensor device 2 are stored and are kept in memory.

Now, description will be given on generals outline of the measuring operation.

The scanning light 5 is projected from the reference plane forming unit 3 by rotary irradiation. A horizontal reference plane is formed, and the distance measuring light 6 is projected from the distance measuring unit 4 by rotary irradiation.

When the scanning light 5 passes through the photodetection unit 19, the photodetection unit 19 detects the scanning light-5. The result of the photodetection is inputted to the photodetection side control arithmetic unit 22. The photodetection side control arithmetic unit 22 transmits the fact that the light is received as a photodetection notifying signal to the radio communication unit 17 via the photodetection side radio communication unit 21. The photodetection side control arithmetic unit 22 calculates an elevation angle based on the result of photodetection, and the calculated elevation angle is recorded in the photodetection side storage unit 23.

The radio communication unit 17 inputs the receiving of the photodetection notifying signal to the control arithmetic unit 8. Then, the control arithmetic unit 8 reads a horizontal angle from the encoder 16 when the signal is received and measures the horizontal angle.

Based on the horizontal angle, the distance measurement drive unit 14 is controlled, and the range of projection of the distance measuring light 6 is controlled. The distance measuring light reflected from the prism 20 is received. Based on the reflected distance measuring light, the distance measuring unit 4 measures a distance to the photodetection sensor device 2. The result of measurement and the measured horizontal angle are transmitted to the photodetection side radio communication unit 21 via the radio communication unit 17, and the photodetection side radio communication unit 21 inputs the result of distance measurement thus received to the photodetection side control arithmetic unit 22.

The photodetection side control arithmetic unit 22 calculates the position in height of the photodetection sensor device 2 based on the result of distance measurement thus received and on the elevation angle. The calculation result of the position in height, the elevation angle, the horizontal angle, and the result of distance measurement are associated with each other and are recorded in the photodetection side storage unit 23.

The calculation result of the position in height and the elevation angle are transmitted to the radio communication unit 17 via the photodetection side radio communication unit 21. The results of measurement such as the position in height, the elevation angle, etc. as received at the radio communication unit 17 are associated with the results of distance measurement and the elevation angle and are recorded in the storage unit 9.

The position in height, the elevation angle, the result of distance measurement, and the result of measurement on the horizontal angle and the like may be stored together in the storage unit 9 or in the photodetection side storage unit 23. Or, these may be recorded together in an external recording unit.

In the process of measurement as described above, from the receiving of the scanning light 5 by the photodetection unit 19 up to the transmission of the photodetection notifying signal from the photodetection side radio communication unit 21, time delay occurs from the reasons such as: the responsiveness of the photodetection unit 19, the delay on the circuit of the photodetection side radio communication unit 21, and the time required for the preparation of the photodetection notifying signal according to the program by the photodetection side control arithmetic unit 22.

Further, on the surveying instrument 1, too, time delay occurs due to the processing time, which is required from the receiving of the photodetection notifying signal by the radio communication unit 17 up to the detection of the horizontal angle.

Therefore, error occurs in the horizontal angle detected by the encoder 16 at the moment when the photodetection notifying signal from the photodetection side radio communication unit 21 is received. The amount of error is obtained as a value of the rotation speed of the scanning light 5 multiplied by the time delay. The time delay caused by program processing, which is one of the causes of the time delay, differs for each processing and is not constant.

For this reason, in order to detect accurate horizontal angle, it is necessary to eliminate the error caused by time delay each time the horizontal angle is measured. Further, in case the distance between the surveying instrument 1 and the photodetection sensor device 2 is longer, e.g. in case it is 300 meters or more, the transmission time (propagation delay time) of the photodetection notifying signal between the photodetection side radio communication unit 21 and the radio communication unit 17 would not be negligible.

According to the present invention, the error caused by time delay is eliminated for each measurement, and accurate horizontal angle can be measured.

Figure 6:
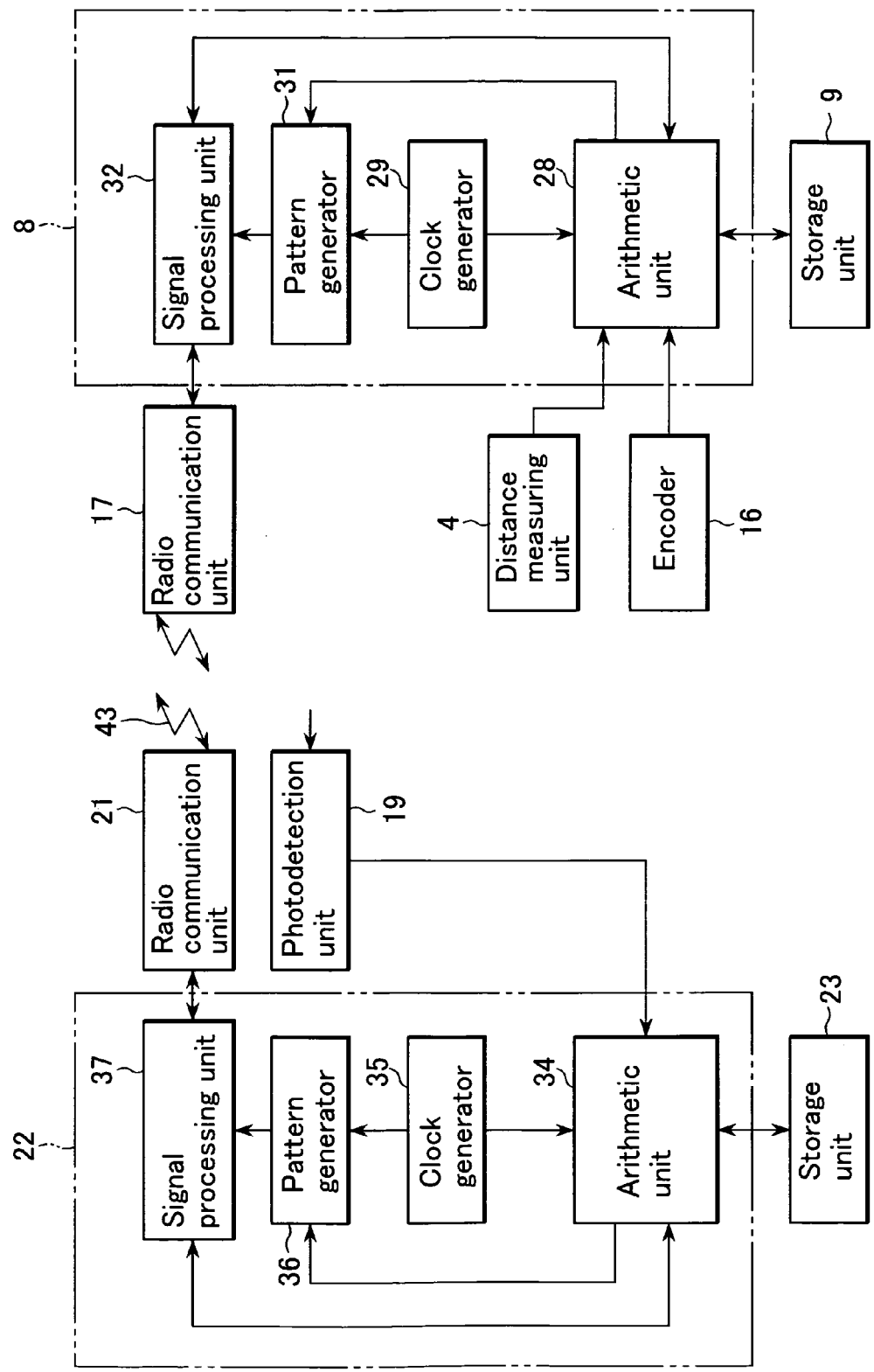
FIG. 6 is a schematical block diagram to show approximate arrangement of a control arithmetic unit of the surveying instrument and the photodetection sensor device.

Description will be given below on the measurement of the horizontal angle according to the present invention referring to FIG. 5 to FIG. 7.

First, description will be given on the control arithmetic unit 8. The control arithmetic unit 8 comprises an arithmetic unit 28 typically represented by a CPU, a clock generator 29, a pattern generator 31 for generating pattern data for synchronization, and a signal processing unit 32 for processing signals for the purpose of transmission and for processing the receiving signals so that the receiving signals can be processed within the control arithmetic unit 8. The arithmetic unit 28 has the function to integrate clock signals from the clock generator 29 and to measure the time. The clock generator 29 and the arithmetic unit 28 make up together a time measuring means.

The photodetection side control arithmetic unit 22 comprises a photodetection side arithmetic unit 34 typically represented by a CPU, a photodetection side clock generator 35, a photodetection side pattern generator 36 for generating a pattern signal for synchronization, and a photodetection side signal processing unit 37 for processing signals for the purpose of transmission and for processing the receiving signals so that the receiving signals can be processed within the photodetection side control arithmetic unit 22. The photodetection side arithmetic unit 34 has the function to integrate clock signals from the photodetection side clock generator 35 and to measure the time. The photodetection side clock generator 35 and the photodetection side arithmetic unit 34 make up together a time measuring means.

When the scanning light 5 is projected from the reference plane forming unit 3 and the scanning light 5 is received by the photodetection unit 19, a photodetection signal 41 is issued. The photodetection signal 41 is then turned to a pulse by signal processing function of the photodetection unit 19 and it is outputted to the photodetection side arithmetic unit 34 as a photodetection signal detecting pulse 42. At the photodetection side arithmetic unit 34, rise-up time of the photodetection signal detecting pulse 42 is acquired. Further, a weighted point of the photodetection signal 41 is calculated, and a time Ta at the weighted position is determined. The time Ta can be determined as described below.

Figure 7:
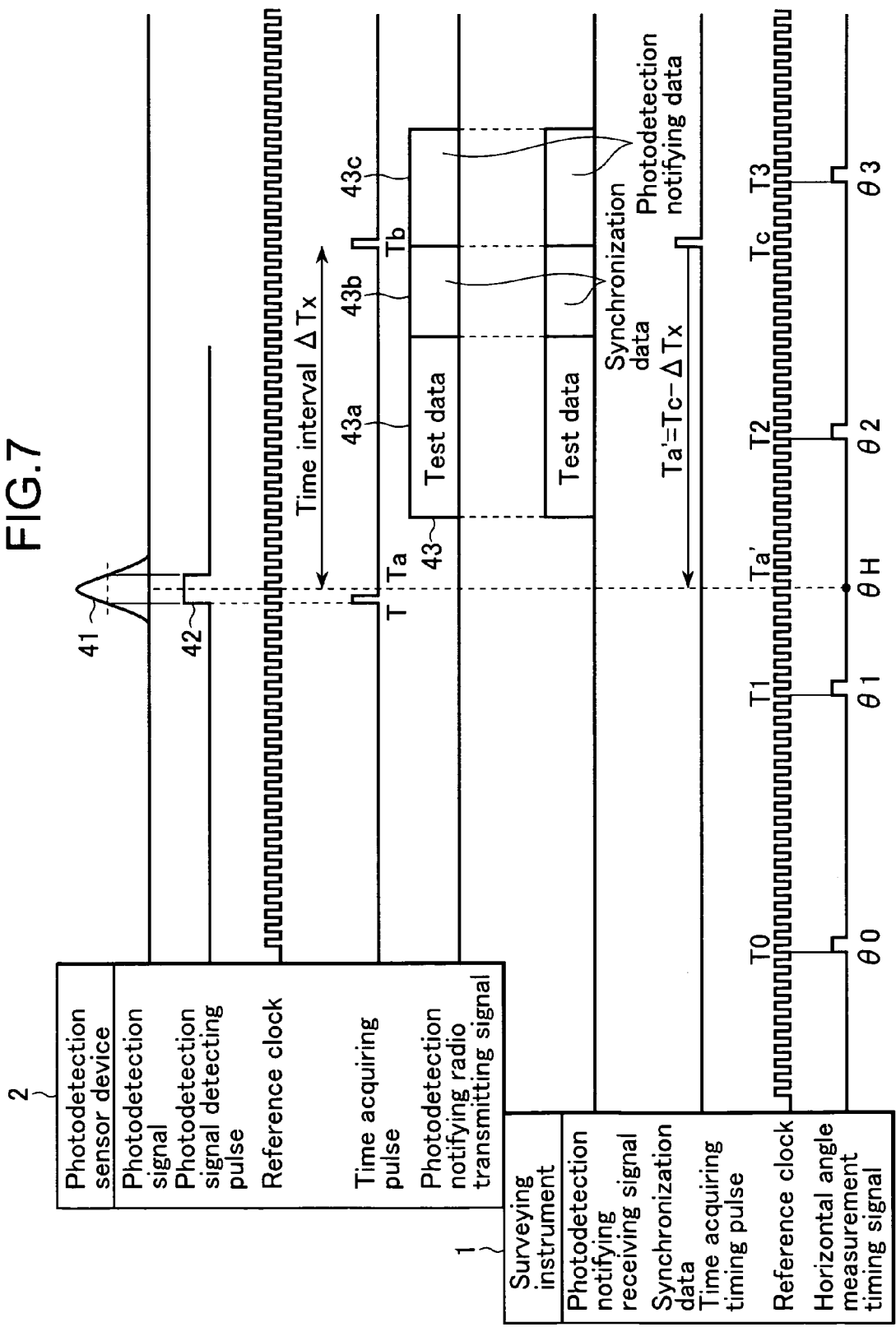
FIG. 7 is a drawing to show the relation of signals between the photodetection sensor device and the surveying instrument when a horizontal angle is measured.

As shown in FIG. 7, the photodetection signal 41 rises up. When it exceeds a predetermined threshold value, the photodetection signal detecting pulse 42 rises up, and a time T is acquired. When the photodetection signal 41 goes down to a level lower than the predetermined threshold value, the photodetection signal detecting pulse 42 falls. In this case, the photodetection signal 41 continues to be detected as long as the period of the photodetection signal detecting pulse 42. The weighted position is obtained by using an area or the like of the photodetection signal 41, and a deviation of the weighted position from the time T is calculated. By using this deviation, the time Ta can be obtained. Here, the area of the photodetection signal 41 is used, while the time Ta may be obtained by finding the time of rise-up and the time of falling.

When the photodetection signal detecting pulse 42 is generated, a pattern signal for synchronization is generated by the photodetection side pattern generator 36, and it is transmitted to the photodetection side signal processing unit 37. At the photodetection signal processing unit 37, the data of the pattern for synchronization is synthesized on a communication signal 43 which is transmitted from the photodetection side radio communication unit 21. The communication signal 43 is transmitted from the photodetection side radio communication unit 21 to the radio communication unit 17.

In the communication signal, a test data 43a, a synchronization pattern data 43b, and a photodetection notifying data 43c are included. Further, if there are two or more measurement data such as elevation angles, positions in height, etc. calculated by the photodetection side arithmetic unit 34, or if there are two or more photodetection sensor devices 2, information data such as identification signal (ID data) for identifying the photodetection sensor devices 2 are added.

In FIG. 7, the test data 43a, the synchronization pattern data 43b, and the photodetection notifying data 43c in the smallest unit are shown. The test data 43a, the synchronization pattern data 43b and the photodetection notifying data 43c are in form of the signals in series. The synchronization pattern data 43b is arranged at a position other than the foremost portion of the communication signal 43, e.g. at an intermediate portion as shown in the figure or at the rearmost portion (not shown).

At the photodetection side signal processing unit 37, the last part of the synchronization pattern data 43b is detected. A time pulse Tb is issued at the last of the synchronization pattern data 43b. Then, an elapsed time ΔTx between the time pulse Ta and the time pulse Tb is obtained. The elapsed time ΔTx is transmitted to the radio communication unit 17 from the photodetection side radio communication unit 21.

The communication signal 43 is received at the radio communication unit 17. The signal processing unit 32 can maintain or prepare a synchronization pattern data 43b', which has equal pattern to the pattern of the synchronization pattern data 43b, as a data for judgment. At the signal processing unit 32, the received communication signal 43 is compared with the synchronization pattern data 43b'. By pattern recognition, the synchronization pattern data 43b in the communication signal 43 is detected, and a time Tc at the control arithmetic unit 8 is acquired at the last of the synchronization pattern data 43b.

The time (the time calculated inversely) by subtracting the elapsed time ΔTx from the time Tc is a time Ta' at the surveying instrument 1 when the scanning light 5 is detected at the photodetection sensor device 2.

At the arithmetic unit 28, an angle signal obtained from the encoder 16 is associated with the time when the angle signal is issued, and the result is recorded in the storage unit 9. By acquiring the time Ta', it is possible to obtain a horizontal angle θH when the photodetection sensor device 2 detects the scanning light 5.

Specifically, if it is supposed that the time Ta' is between the time T1 and the time T2 at the surveying instrument 1, and that horizontal angles detected by the encoder 16 at the time T1 and the time T2 are θ1 and θ2 respectively, the horizontal angle θH can be obtained from the following equation:

$$\theta H = (\theta 2 - \theta 1) \times (Ta' - T1)/(T2 - T1) + \theta 1 \quad \text{(Equation 1)}$$

In the synchronizing operation of the surveying instrument 1 and the photodetection sensor device 2, there is a time lag in the time period when the photodetection sensor device 2 receives the scanning light 5 and prepares and transmits the communication signal 43. Also, this time lag is not constant and it varies each time. That is, the value of the elapsed time ΔTx varies at each measurement.

According to the present invention, the horizontal angle θH is obtained by calculating the elapsed time ΔTx at each measurement. Accordingly, an accurate horizontal angle θH can be measured despite of the error on the circuit or the error in software processing. For the purpose of increasing the measurement accuracy, it may be so designed that the value of the horizontal angle θH is determined two or more times and an average value is calculated.

In case there are provided two or more photodetection sensor devices 2, ID data added to the communication signal 43 is identified by means such as pattern recognition at the signal processing unit 32, and the measured horizontal angle is associated with the ID data so that the photodetection sensor device 2 can be identified. The measurement data, etc. are associated with ID data and is turned to the data unique to the photodetection sensor device 2, for which the identification data can be specified by ID data. Then, the data is stored in the storage unit 9. Or, it may be transmitted to the photodetection sensor device 2.

In the measurement of the horizontal angle as described above, the horizontal angle is determined by assuming that the time is negligible, i.e. the time, in which the scanning light 5 reaches the photodetection sensor device 2 from the surveying instrument 1, or the time, in which the communication signal 43 reaches the surveying instrument 1 from the photodetection sensor device 2, is negligible. However, when a distance between the surveying instrument 1 and the photodetection sensor device 2 exceeds 300 meters, for instance, measurement error would appear. This distance differs according to the measurement accuracy required for the measuring system.

In this case, based on the results of distance measurement measured at the distance measuring unit 4 and on light velocity, the reaching time of the scanning light 5 and the reaching time of the communication signal 43 are obtained. By regarding these values of time as delay time, the horizontal angle obtained is compensated. Regarding the judgment as to whether compensation should be made or not, a distance for execution of compensation is set up depending on the measurement accuracy required, and compensation is performed when the measured distance exceeds the distance for execution of compensation. It may be so designed that the distance for execution of compensation is not set up and the horizontal angle is compensated at all times depending on the distance measured.

In the embodiment of the invention as described above, description has been given on a case where a plurality of fan-shaped laser beams are projected by rotary irradiation. However, when one fan-shaped laser beam or when a spot-like laser beam is projected by rotary irradiation, the horizontal angle can be measured in the same manner by synchronizing the surveying instrument 1 and the photodetection sensor device 2.

As a medium for radio communication, electric communication may be used, or optical communication may be used by modulating the light and with signals superimposed on the light.

Although bi-directional communication is described in the present embodiment, uni-directional communication may be used. This can be applied when measurement is not made by using two or more photodetection devices at the same time.

According to the present invention, there is no need to synchronize the operation of the surveying instrument 1 and the photodetection sensor devices 2 at all times. Accordingly, the stability with high accuracy may not necessarily be maintained in the clock signals of the surveying instrument 1 and the photodetection sensor devices 2. Thus, there are such effects that continuous communication to maintain synchronization between the two devices is not needed, and that high stability of the communication devices is not required.

According to the present invention, the reflection light of the scanning light 5 is not used for the detection of the photodetection sensor device 2. It will suffice if the intensity of the scanning light 5 is such an intensity that the scanning light 5 reaches the photodetection sensor device 2. This makes it possible to decrease the intensity of the scanning light 5 or to detect the photodetection sensor device 2 which is located at long distance.

According to the present invention, radio communication means are provided so that communication can be performed. Thus, the photodetection sensor device can notify its presence to the surveying instrument. In this respect, the photodetection sensor device can join in the measuring operation or can be separated from the measuring operation with no operator assigned on the surveying instrument side.

What is claimed is:

1. A measuring system, comprising a surveying instrument for projecting a laser beam by rotary irradiation and a photodetection sensor device installed at a measuring point, wherein said surveying instrument comprises a first radio communication unit, said photodetection sensor device comprises a second radio communication unit, and communication can be performed between said surveying instrument and said photodetection sensor device, wherein said surveying instrument comprises an angle detecting means for detecting a horizontal angle in a projecting direction of the laser beam and a first arithmetic unit for controlling said angle detecting means based on a receiving signal from said first radio communication unit, and said photodetection sensor device comprises a photodetection unit for receiving the laser beam and a second arithmetic unit for performing transmission of a photodetection notifying signal to notify the receiving of the laser beam by said photodetection unit and also for performing transmission of synchronization data including a signal processing delay between said surveying instrument and said photodetection sensor device by said second radio communication unit to said first radio communication unit, wherein said first arithmetic unit calculates a horizontal angle of the projection of the laser beam when said photodetection sensor device receives the laser beam based on the photodetection notifying signal and the synchronization data.

2. A measuring system, comprising a surveying instrument for projecting a laser beam by rotary irradiation and a photodetection sensor device installed at a measuring point, wherein said surveying instrument comprises a first radio communication unit, said photodetection sensor device comprises a second radio communication unit, and communication can be performed between said surveying instrument and said photodetection sensor device, wherein said photodetection sensor device comprises a photodetection unit for detecting the laser beam, a second signal processing unit for preparing a photodetection notifying signal based on the detection of the laser beam by the photodetection unit, for synthesizing synchronization data including a signal processing delay between said surveying instrument and said photodetection sensor device with the photodetection notifying signal, and for detecting the synchronization data, and said second radio communication unit for transmitting the photodetection notifying signal to said surveying instrument, and wherein said surveying instrument comprises said first radio communication unit for receiving the photodetection notifying signal and said first signal processing unit for detecting synchronization data from the photodetection notifying signal, wherein said photodetection sensor device detects the synchronization data and the synchronization data is detected by said surveying instrument, and signal processing is synchronized between said photodetection sensor device and said surveying instrument so as to decrease said delay.

3. A measuring system according to claim 2, wherein the signal processing is signal processing for detecting a horizontal angle, wherein said photodetection sensor device comprises a second time measuring means, said second time measuring means measures a time $\Delta T$ from the moment of the detection of the laser beam by the photodetection unit to the moment of the transmission of synchronization data of the transmitted photodetection notifying signal, and the time $\Delta T$ is transmitted to said surveying instrument via said second radio communication unit, and wherein said surveying instrument comprises a first time measuring means, an angle detecting means for detecting a horizontal angle associated with the time, and an arithmetic unit for calculating the horizontal angle, wherein said first time measuring means detects the time of detection of the synchronization data, said arithmetic unit inversely calculates the time $\Delta T$ from the detected time, calculates the time when the photodetection unit detects the laser beam, and calculates the horizontal angle by the angle detecting means at said time.

4. A measuring system according to claim 3, wherein said surveying instrument has a distance measuring unit, a distance to said photodetection sensor device is measured by said distance measuring unit, and an error in the horizontal angle caused by time delay in propagation time of the laser beam or in propagation time of the photodetection notifying signal is compensated according to the measured distance.

5. A measuring system according to claim 3, wherein said surveying instrument has a distance measuring unit, a distance to said photodetection sensor device is measured by said distance measuring unit, and when the measured distance is more than a predetermined value, an error in the horizontal angle due to delay in propagation time of the laser beam or in propagation time of the photodetection notifying signal is compensated.

6. A measuring system according to claim 4, wherein said photodetection sensor device transmits an ID data to said surveying instrument, and said surveying instrument associates the ID data with the horizontal angle so that said photodetection sensor device can be identified.

7. A measuring system according to claim 1 or 2, wherein the laser beam is a fan-shaped laser beam.

8. A measuring system according to claim 1, 2 or 3, wherein test data is further included in the photodetection notifying signal.

9. A measuring system according to claim 6, wherein the ID data is added to the photodetection notifying signal.

* * * * *